United States Patent [19]

Andrä

[11] Patent Number: 4,693,455
[45] Date of Patent: Sep. 15, 1987

[54] TWO-CHAMBER MOTOR SUPPORT WITH HYDRAULIC DAMPING

[75] Inventor: Rainer Andrä, Limburg, Fed. Rep. of Germany

[73] Assignee: Metzeler Kautschuk GmbH, Munich, Fed. Rep. of Germany

[21] Appl. No.: 738,165

[22] Filed: May 24, 1985

[30] Foreign Application Priority Data

May 24, 1984 [DE] Fed. Rep. of Germany ....... 3419437

[51] Int. Cl.[4] ............................................. F16F 15/02
[52] U.S. Cl. ................................. 267/140.1; 188/379; 248/562; 267/217
[58] Field of Search ............ 267/8 D, 136, 137, 140.1, 267/8 R, 8 B, 8 C, 8 A, 9 R, 9 B, 9 A, 9 C, 10; 180/312, 300; 188/267, 285, 378, 379, 380; 248/562, 566, 636

[56] References Cited

U.S. PATENT DOCUMENTS 4,418,897 12/1983 Härtel et al. ..................... 267/140.1

FOREIGN PATENT DOCUMENTS

| 2927757 | 2/1981 | Fed. Rep. of Germany | 188/267 |
| 3125040 | 3/1983 | Fed. Rep. of Germany | 188/380 |
| 56-66539 | 6/1981 | Japan | 267/140.1 |
| 58-37337 | 3/1983 | Japan | 267/140.1 |
| 58-113644 | 7/1983 | Japan | 267/140.1 |
| 59-65640 | 4/1984 | Japan | 267/140.1 |
| 59-103043 | 6/1984 | Japan | 267/140.1 |
| 580384 | 11/1977 | U.S.S.R. | 267/140.1 |

Primary Examiner—George E. A. Halvosa
Assistant Examiner—Matthew C. Graham
Attorney, Agent, or Firm—Herbert L. Lerner; Laurence A. Greenberg

[57] ABSTRACT

A two-chamber engine mount with hydraulic damping includes a housing having rubber-elastic peripheral walls and an engine side to be connected to an engine, an intermediate plate dividing the housing into fluid-filled chambers being in communication with each other through a penetration formed in the intermediate plate, and an active vibration generator being integrated into one of the fluid-filled chambers closest to the engine side and being controllable in dependence on predetermined operating parameters.

7 Claims, 3 Drawing Figures

TWO-CHAMBER MOTOR SUPPORT WITH HYDRAULIC DAMPING

The invention relates to a two-chamber engine mount with hydraulic damping, especially for motor vehicles, having chambers that are filled with fluid and have rubber-elastic peripheral walls, the chambers communicating with each other through a penetration conduct in an intermediate plate.

Engine mounts or motor supports of this type are known, for example, from German Published, Non-Prosecuted Application DE-OS No. 30 27 742 and DE-OS No. 32 44 295, the former corresponding to U.S. Pat. No. 4,418,897. In general, such mounts do not respond to high frequency vibrations with small amplitudes, so that these vibrations are only negligibly damped, while in the case of vibrations of decreasing frequency and increasing amplitude, increasing damping action takes place due to an increasing fluid exchange through the connection formed through the intermediate plate. Hydraulic de-coupling of small amplitudes to a greater or lesser degree in a frequency range of about 300 Hz takes place by means of the elastic support of the intermediate plate or the special construction of a membrane with a quenching mass. This improves the acoustic behavior. A purely amplitude-coupling of the dynamic stiffness of the support for small amplitudes is not much better than the stiffness of the support spring, i.e. the peripheral wall at the engine side. With frequency decoupling, a lowering of the dynamic stiffness below the static stiffness of the support spring can be achieved in a certain relatively narrow frequency range. The mode of operation of such supports is determined by the geometry, mass and stiffness of the vibration systems used in the motor support. The relatively narrow band width during operation makes this structure unsatisfactory.

Therefore, the maximum degree of efficiency is achieved if the vibrating parts, i.e. the elastically supported intermediate plate and possibly the rubber membrane with the quenching mass, vibrate in the opposite phase to the excitation, i.e. to the fluid mass in the support chambers, so that a complete hydraulic de-coupling is effected. The generation of such counter-phase vibrations only depends to a great degree on the geometric parameters and the mass of the parts which can vibrate, and can always be optimally constructed for only a relatively narrow band width. This means that such systems can only be structured for a special load situation and that such hydraulically-damped supports therefore represent passive damping elements, which react in a predetermined way to a certain load, without providing control or regulating at the engine mount itself.

It is accordingly an object of the invention to provide a two-chamber engine mount with hydraulic damping, which overcomes the hereinafore-mentioned disadvantages of the heretofore-known devices of this general type, in which acoustic behavior can be adjusted to the existing requirements within wide ranges and through which the dynamic stiffness can be lowered over a broad band region, in particular.

With the foregoing and other objects in view there is provided, in accordance with the invention, a two-chamber engine mount with hydraulic damping, comprising a housing having rubber-elastic peripheral walls and an engine side to be connected to an engine, an intermediate plate dividing the housing into fluid-filled chambers being in communication with each other through a penetration formed in the intermediate plate, and an active vibration generator being integrated into one of the fluid-filled chambers closest to the engine side and being controllable in dependence on predetermined operating parameters.

With an active system of this type having a vibration generator which can be controlled from the outside, vibrations can be generated at any frequency in the opposing phase to the excitation of the fluid mass in the support chambers, so that in practice, the hydraulic and acoustic behavior of the support can be controlled independently of frequency and amplitude.

This vibration generator which is activated and controlled from the outside, basically can be energized and constructed with pneumatic or electro-dynamic means, for example.

In accordance with an added feature of the invention, there is provided a membrane chamber disposed in the one fluid-filled chamber closest to the engine side, and a membrane with a quenching mass closing off the membrane chamber, the vibration generator being an electro-dynamically operating vibration generator with an active vibrating part formed by the membrane and the quenching mass. This is advantageous especially in engine mounts which are already provided with a membrane having a quenching mass for closing the support chamber at the engine side.

In accordance with an additional feature of the invention, there is provided an annular permanent magnet element and an electrical coil element in the membrane chamber being mutually spaced apart and concentric, one of the elements being fixedly connected to the quenching mass.

In accordance with a further feature of the invention, the the membrane is rubber-elastic, the membrane chamber has an inner wall surface, the quenching mass is cup-shaped and is connected to the membrane, the permanent magnet element is concentrically secured to the inner wall surface, and the coil element surrounds the quenching mass.

In accordance with still another feature of the invention, there is provided an engine support plate closing the one fluid-filled chamber closest to the engine side from the engine side, the membrane chamber being centrally disposed on the engine support plate, and the membrane closing off the membrane chamber from the one fluid-filled chamber closest to the engine side.

In accordance with still an additional feature of the invention, the membrane chamber is centrally disposed in the intermediate plate, and the membrane closes off the membrane chamber from the one fluid-filled chamber closest to the engine side.

In accordance with still a further feature of the invention, there are provided means for controlling the current of the coil in dependence on acceleration of the engine.

In accordance with a concomitant feature of the invention, there are provided means for controlling the current of the coil in dependence on the pressure inside the engine mount.

Other features which are considered as characteristic for the invention are set forth in the appended claims.

Although the invention is illustrated and described herein as embodied in a two-chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
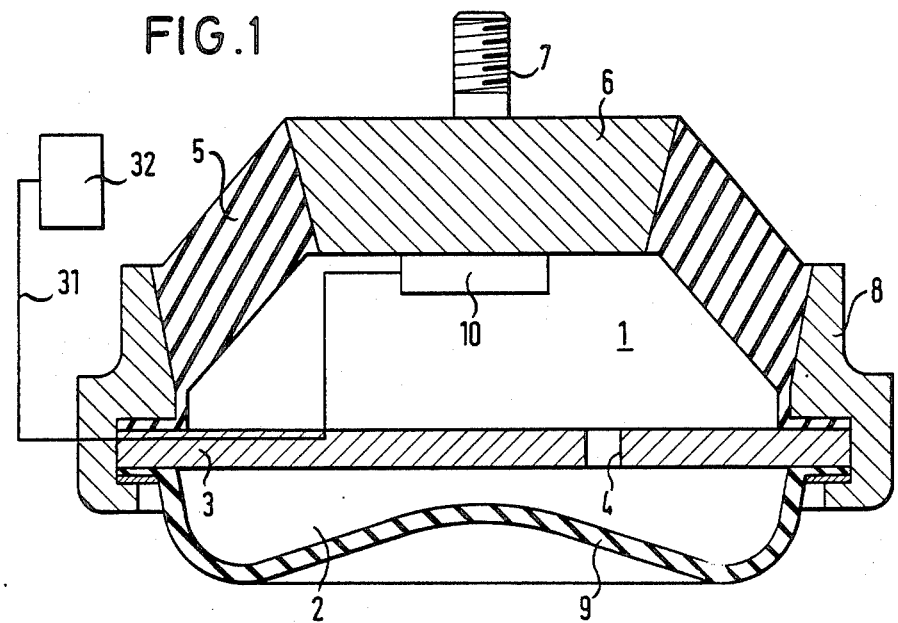
FIG. 1 is a diagrammatic longitudinal-sectional view of a two-chamber engine mount or motor support, showing the principle behind the construction of the vibration generator of the invention.

Referring now to the figure of the drawings in detail and first, particularly, to FIG. 1 thereof, there is seen a hydraulically damped two-chamber engine mount or motor support, essentially including an upper chamber 1 at the motor or engine side and a lower chamber 2, which are filled with hydraulic fluid and are separated from each other by an intermediate plate 3 which has a throttling or restricting opening or orifice 4 formed therein. The upper chamber 1 is surrounded by a strong-walled chamber wall 5 forming a so-called support spring. The chamber wall 5 has the shape of a hollow cone, is made of a rubber-elastic material, and is closed at the upper end surface thereof by an engine or motor support plate 6 which is provided with a threaded stud 7. The chamber wall 5 is connected at the lower, outer periphery thereof with an annular counter support 8. The lower chamber 2 is formed by a chamber wall 9 which is also made of a rubber-elastic material and may be shaped like a saucer. The chamber wall 9 is also secured to the counter support 8 forming a tight seal. The intermediate plate 3 is also fastened in the counter support 8.

According to the invention, an active vibration generator 10 is installed in the chamber 1 at the engine side. A control line 31 operatively or functionally connects the vibration generator 10 to a control unit 32 which is located outside the engine mount. For example, the control unit 32 may control a coil of the vibration generator in dependence on the acceleration of the engine or the pressure inside the engine mount. The control line can be disposed in any suitable manner. The vibration generator, which can be of a pneumatic, hydraulic, or elecro-dynamic type, makes it possible to generate controlled vibrations which are in the opposite phase as compared to the vibrations existing in the engine mount or in the fluid inside the chamber 1 and the chamber 2. In this way, a complete hydraulic de-coupling is achieved as well as a considerable reduction of the dynamic stiffness. Since the frequency and the amplitude of the vibration generator 10 can be set to practically any chosen value, a control of the behavior of the support which is independent of frequency and amplitude becomes possible. In this way, the dynamic stiffness especially can be lowered over the entire frequency range of the engine mount, at least to the static stiffness of the support spring 5.

Figure 2:
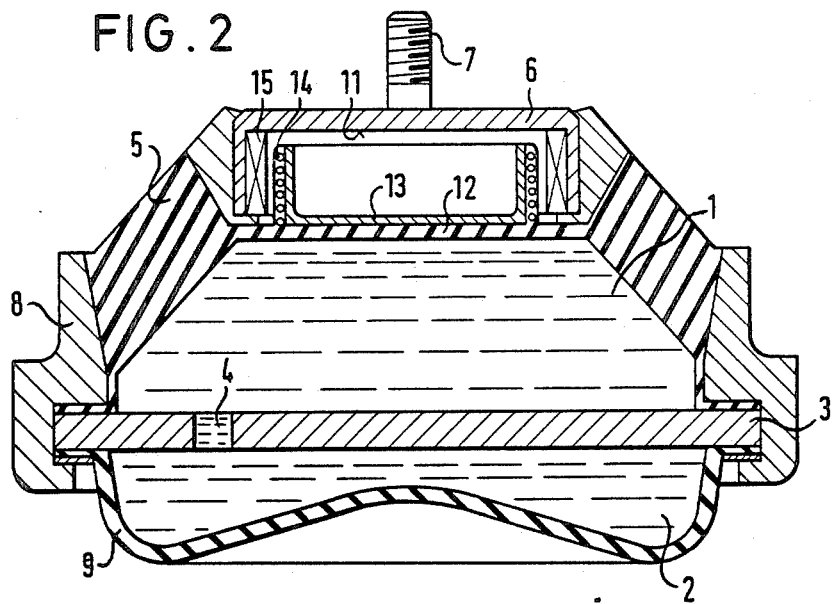
FIG. 2 is a longitudinal-sectional view of an engine mount with the vibration generator integrated into an end surface membrane chamber.
Figure 3:
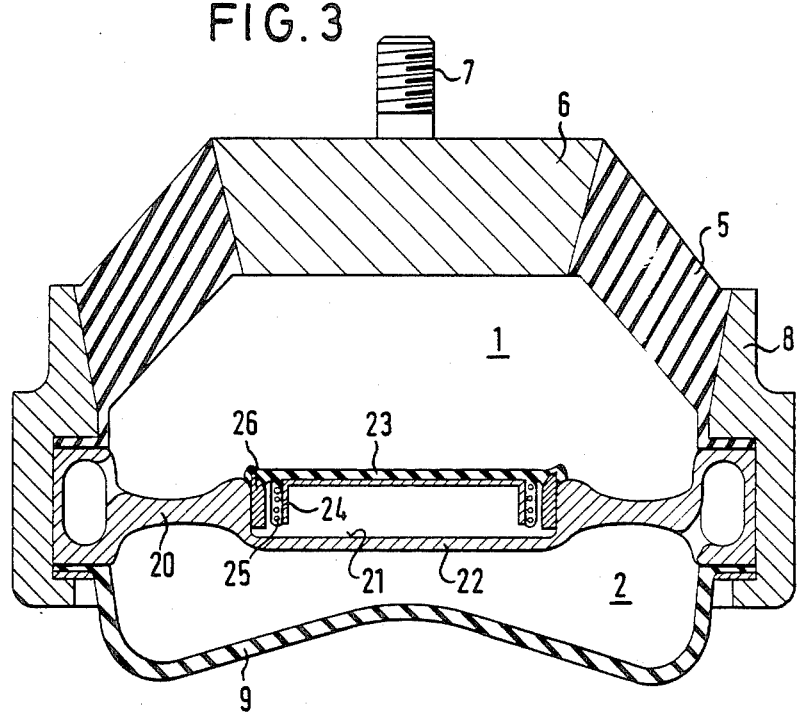
FIG. 3 is a longitudinal-sectional view of an engine mount with the vibration generator integrated into an intermediate plate.

Typical embodiments of the construction of the vibration generator are further explained with regard to FIGS. 2 and 3. According to FIG. 2, the engine mount has a cylindrical recess 11 formed in the lower surface of the engine support plate, in the region adjacent the upper chamber 1. The recess 11 serves as a membrane chamber, which is separated or closed off from the chamber 1 by an elastic rubber membrane 12 with a central quenching mass 13. According to the illustrated embodiment, the quenching mass 13 is cup-shaped and is surrounded by a coil 14 at the outer periphery thereof. The coil is connected to an external current source in a manner not shown in the drawing. An annular permanent magnet 15 is fastened to the cylindrical inner wall of the membrane chamber 11, opposite the coil 14. The membrane chamber 11 can be open or closed to the outside and may be maintained at a predetermined gas pressure.

Generally, when motion, or vibration of the engine is applied to the engine support plate 6, a dynamic force is generated by the mass of the fluid contained in chamber 1, which depends on the engine motion and on the engine acceleration. This dynamic force acts on the elastic membrane 12 with the quenching mass 13 as hydraulic pressure. The membrane is deflected upward when a load is applied and moves correspondingly downward when the load is removed, so that it vibrates as a separate mass. When the elastically supported quenching mass 13 vibrates in the opposite phase as compared to the excitation, i.e. to the fluid in the chambers 1 and 2, a complete hydraulic de-coupling is effected. However, since the frequency and amplitude of the vibration of the quenching mass 13 is essentially determined by the mass, pressure and volume of the membrane chamber 11 and the spring constant of the rubber membrane 12, the above-described counterphase vibration will occur only in a narrow frequency band. However, if the membrane is constructed as an active vibration generator, the coil 14 is energized by an alternating current with adjustable frequency, and vibrations of the membrane 12 having predetermined frequency and amplitude can be induced. The induced vibrations always lie in the opposite phase to the vibrations of the fluid in the chamber 1, so that a complete hydraulic de-coupling at all occuring frequencies is thereby possible and a favorable acoustic transfer condition can be set.

Another embodiment of the device is shown in FIG. 3, wherein the vibration generator is integrated into an intermediate plate 20. For this purpose, the intermediate plate 20 has a central, thicker region with a cylindrical recess, which serves as a membrane chamber 21. The chamber is bordered at the bottom thereof by a rigid wall 22 and at the top by a membrane 23.

The quenching mass 24 which is again cup-shaped, is disposed at the inner surface of the membrane 23. Corresponding to the embodiment of FIG. 2, the quenching mass 24 carries a coil 25 at the outside thereof. A fixed, annular permanent magnet 26 is disposed opposite the coil. In the illustrated embodiment, the magnet is in the form of a spring ring which braces the outside of the membrane 23 in the membrane chamber 21.

The above-described vibratory configuration can act as an additional quenching mass, corresponding to the embodiment according to FIG. 2, with the quenching mass disposed in the upper engine support plate 6, and can then be excited to act as an active vibration system by the current which flows through coil 25.

In this way, the control of the vibration generator can be provided in dependence on the motor acceleration, for example, or a pressure measurement effected within the motor support, or in dependence on the force transferred by the support.

The invention is therefore not limited to the illustrated embodiments which have been used as examples, but rather includes other construction variations which utilize the principle set forth according to the invention. In particular, the position of the coil and the permanent magnet may be exchanged, or another configuration or arrangement of the membrane chamber may be chosen.

The result is an active motor support, wherein the frequency as well as the phase relationship and the amplitude can be controlled, in order to lower the dynamic stiffness over the entire frequency range and to therefore optimize the acoustic behavior of the engine mount.

I claim:

1. Two-chamber engine mount with hydraulic damping, comprising a housing having rubber-elastic peripheral walls and an engine side to be connected to an engine, an intermediate plate dividing said housing into fluid-filled chambers being in communication with each other through a penetration formed in said intermediate plate, an active electro-dynamic vibration generator being integrated into one of said fluid-filled chambers closest to said engine side and being controllable in dependence on predetermined operating parameters, a membrane chamber disposed in said one fluid-filled chamber closest to said engine side, and a membrane with a quenching mass closing off said membrane chamber, said vibration generator being an electro-dynamically operating vibration generator with an active vibrating part formed by said membrane and said quenching mass.

2. Two-chamber engine mount according to claim 1, including an annular permanent magnet element and an electrical coil element in said membrane chamber being mutually spaced apart and concentric, one of said elements being fixedly connected to said quenching mass.

3. Two-chamber engine mount according to claim 2, wherein said membrane is rubber-elastic, said membrane chamber has an inner wall surface, said quenching mass in cup-shaped and is connected to said membrane, said permanent magnet element is concentrically secured to said inner wall surface, and said coil element surrounds said quenching mass.

4. Two-chamber engine mount according to claim 3, including an engine support plate closing said one fluid-filled chamber closest to said engine side from said engine side, said membrane chamber being centrally disposed on said engine support plate, and said membrane closing off said membrane chamber from said one fluid-filled chamber closest to said engine side.

5. Two-chamber engine mount according to claim 3, wherein said membrane chamber is centrally disposed in said intermediate plate, and said membrane closes off said membrane chamber from said one fluid-filled chamber closest to said engine side.

6. Two-chamber engine mount according to claim 2, including means for controlling the current of said coil in dependence on acceleration of the engine.

7. Two-chamber engine mount according to claim 2, including means for controlling the current of said coil in dependence on the pressure inside the engine mount.

* * * * *